(12) United States Patent
Jecmen et al.

(10) Patent No.: US 7,174,133 B2
(45) Date of Patent: Feb. 6, 2007

(54) SYSTEMS AND METHODS FOR DETERMINING THE DELAY OFFSETS OF COMMUNICATION SYSTEMS

(75) Inventors: Scott Jecmen, Rockledge, FL (US); Jeff Baker, Satellite Beach, FL (US)

(73) Assignee: Agilent Technologies, Inc., Santa Clara, CA (US)

(*) Notice: Subject to any disclaimer, the term of this patent is extended or adjusted under 35 U.S.C. 154(b) by 510 days.

(21) Appl. No.: 10/439,607

(22) Filed: May 16, 2003

(65) Prior Publication Data
US 2004/0228368 A1 Nov. 18, 2004

(51) Int. Cl.
*H04B 17/00* (2006.01)

(52) U.S. Cl. .............. 455/67.16; 455/456.2; 455/69; 455/423; 455/424; 455/456.5; 455/67.14

(58) Field of Classification Search .......... 455/456.2, 455/423, 424, 456.5, 67.14, 67.16, 11.1, 16
See application file for complete search history.

(56) References Cited

U.S. PATENT DOCUMENTS

| | | | | |
|---|---|---|---|---|
| 5,734,985 A | * | 3/1998 | Ito et al. | 455/503 |
| 5,884,142 A | * | 3/1999 | Wiedeman et al. | 455/12.1 |
| 5,903,844 A | * | 5/1999 | Bruckert et al. | 455/456.2 |
| 5,907,577 A | * | 5/1999 | Hoole | 375/130 |
| 6,169,887 B1 | * | 1/2001 | Cordell et al. | 455/242.2 |
| 6,192,247 B1 | * | 2/2001 | Dillon et al. | 455/446 |
| 6,501,955 B1 | * | 12/2002 | Durrant et al. | 455/456.1 |
| 6,729,929 B1 | * | 5/2004 | Sayers et al. | 455/446 |
| 7,013,111 B2 | * | 3/2006 | Kuwahara et al. | 455/11.1 |

* cited by examiner

*Primary Examiner*—Marceau Milord

(57) ABSTRACT

Methods for determining delay offsets of communication systems are provided. One such method comprises: determining components of a propagation path of a base station of a communication network; determining a propagation delay associated with each of the components; and determining a delay of the propagation path using the delays of the components. Systems also are provided.

20 Claims, 6 Drawing Sheets

| COMPONENT | NOTE | DELAY (nsec) |
|---|---|---|
| ANTENNA | | 0.5 |
| TOWER JUMPER | 8 ft @ 1.5 nsec / ft | 12 |
| TOWER TOP AMP | | 2 |
| MAIN COAX | 150 ft @ 1.2 nsec / ft | 180 |
| CAVITY FILTER | | 1.5 |
| COAX | 4 ft @ 1.5 nsec / ft | 6 |
| DIRECT. COUPLER | | 2 |
| COAX | 2 ft @ 1.5 nsec / ft | 3 |
| | TOTAL DELAY | 207 |

| | | 702 | |
|---|---|---|---|
| BASE STATION ID | 12345ABCXYZ | | |

| COMPONENTS | NOTE (TYPE)(LENGTH)(DELAY) | | | | DELAY (nsec) |
|---|---|---|---|---|---|
| ANTENNA | XXX-00 710 | | | 712 | 0.5 |
| TOWER JUMPER | YY-111 | 8 ft | @ | 1.5 nsec / ft | 12 |
| TOWER TOP AMP | Z-0101 | | | | 2 |
| MAIN COAX | | 150 ft | @ | 1.2 nsec / ft | 180 |
| CAVITY FILTER | ABC-123 | | | | 1.5 |
| COAX | | 4 ft | @ | 1.5 nsec / ft | 6 |
| DIRECT. COUPLER | AA-000 722 | | | 724 | 1.5 |
| COAX 720 | | 2 ft | @ | 1.5 nsec / ft | 3 |
| OTHER | | | | 730 | |
| | TOTAL DELAY | | | | 206.5 |

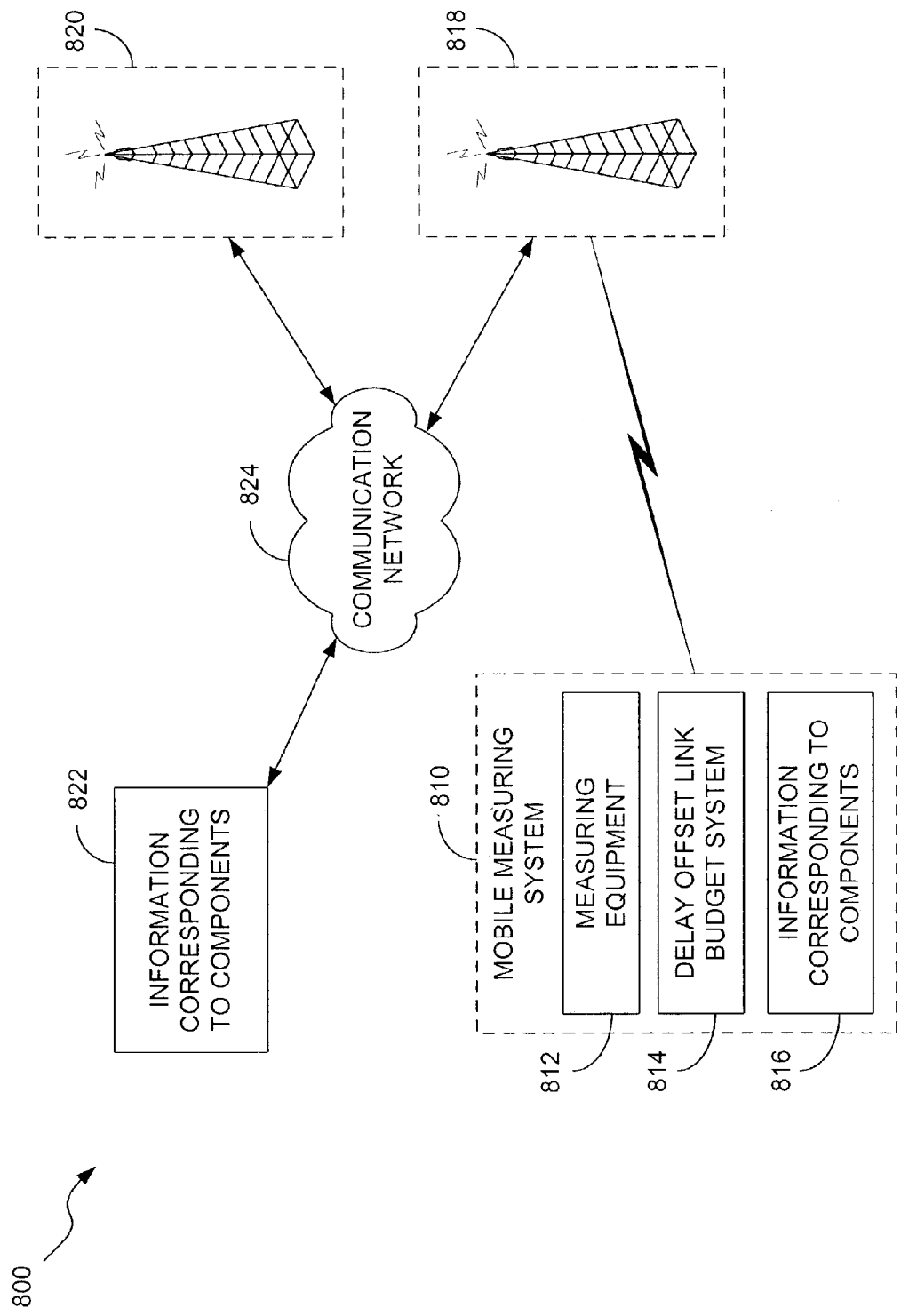

US 7,174,133 B2

SYSTEMS AND METHODS FOR DETERMINING THE DELAY OFFSETS OF COMMUNICATION SYSTEMS

TECHNICAL FIELD

This disclosure generally relates to communication systems.

DESCRIPTION OF THE RELATED ART

Land-based communication systems, such as cellular networks, are beginning to incorporate features for reporting the position of mobile transceivers for emergency use. In such a system, one of the parameters typically needed for accurate position determination is the signal propagation delay associated with the system base stations. With respect to a transmittal signal, the delay corresponds to the time during which the signal propagates from a transmitter to an antenna face of a base station, e.g., a cell tower. With respect to a received signal, the delay corresponds to the time during which the signal propagates from an antenna face of a base station to a receiver. Once such delays ($t_d$) are known, delay offsets ($-t_d$) can be used to compensate for the delays.

Typically, a delay offset of a transmit path is measured by placing a receive antenna and associated measuring device in front of a base station antenna. The receive antenna and measuring device are then used to measure the arrival time of one or more parameters of a signal that is transmitted from the base station antenna. Unfortunately, measuring delay offset in this manner is expensive and time consuming. Specifically, the measuring device typically is expensive, a laser range finder (also expensive) typically is used to measure the distance between the base station antenna and the receive antenna, and precise timing is required, which may necessitate the use of a GPS signal. Note, this technique cannot be used to measure the delay offset of the receive path of the base station antenna.

Delay offset also can be determined by connecting test equipment directly to the antenna feed line of the base station. Potentially, this technique can be very accurate. However, the technique requires direct access to the base station equipment and, as is known, direct access is not always practical.

SUMMARY

Systems and methods for determining delay offsets of communication systems are provided. An embodiment of such a method comprises: determining components of a propagation path of a base station of a communication network; determining a propagation delay associated with each of the components; and determining a delay of the propagation path using the delays of the components.

An embodiment of a system for determining information corresponding to a delay offset of a communication system comprises a delay offset link budget system operative to determine components of a propagation path of a base station of a communication network, to determine a propagation delay associated with each of the components, and to determine information corresponding to the delay of the propagation path using the delays of the components.

An embodiment of a computer-readable medium having a computer program for determining a delay offset of a communication system comprises: logic configured to determine components of a propagation path of a base station of a communication network; logic configured to determine a propagation delay associated with each of the components; and logic configured to determine a delay of the propagation path using the delays of the components.

Other systems, methods, features and/or advantages will be or may become apparent to one with skill in the art upon examination of the following drawings and detailed description. It is intended that all such additional systems, methods, features, and advantages be included within this description and be protected by the accompanying claims.

BRIEF DESCRIPTION OF THE DRAWINGS

FIG. 7 is a schematic diagram depicting another embodiment of a graphical user interface that can be provided.

FIG. 8 is a schematic diagram depicting multiple communication network base stations being tested using an embodiment of a delay offset link budget system.

DETAILED DESCRIPTION

As will be described in detail here, systems and methods are able to determine information corresponding to delay offsets of communications equipment. By way of example, some embodiments are able to determine delay offsets associated with both the forward and reverse link paths of communication system base stations.

Figure 1:
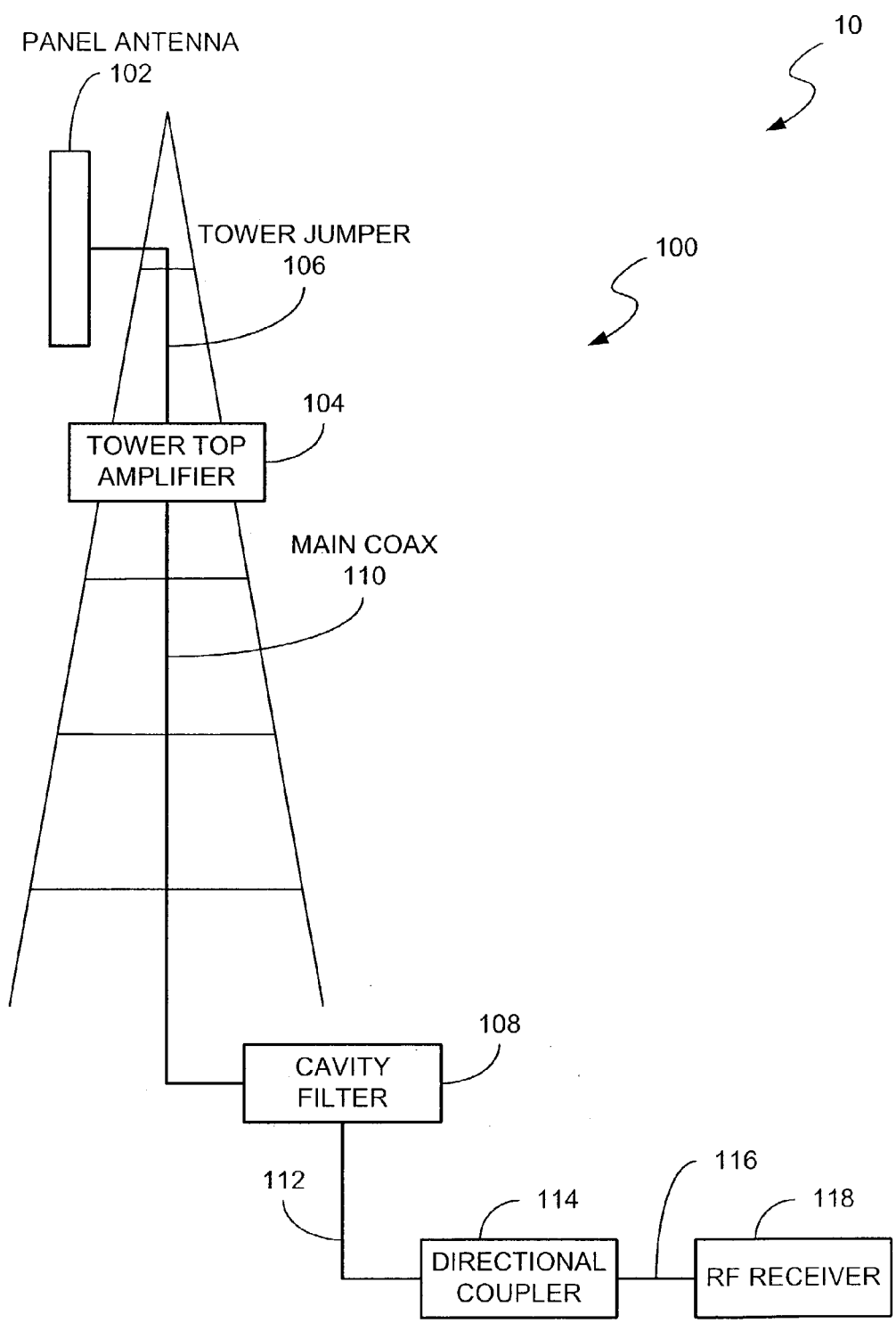
FIG. 1 is a schematic diagram depicting a representative communication network base station and associated components.

A representative embodiment of a base station 10 that includes a receive link path 100 is depicted in FIG. 1. As shown in FIG. 1, base station 10 includes a panel antenna 102 that is electrically connected to a tower top amplifier 104 via a tower jumper 106. The tower top amplifier 104 is electrically connected to a cavity filter 108 via a main coax cable 10. Coax cable 112 electrically interconnects the cavity filter 108 and a directional coupler 114 and coax cable 116 electrically interconnects the directional coupler 114 and an RF receiver 118.

Receive link path 100 exhibits a signal propagation delay corresponding to the time during which a signal received at panel antenna 102 propagates to the RF receiver 118. This delay includes the propagation delay associated with each of the components that form the propagation path between the panel antenna 102 and the RF receiver 118. Specifically, the delay of the receive link path 100 is the sum of the 0.5 nanosecond delay of the panel antenna 102, the 12 nanosecond delay of the tower jumper 106, the 2 nanosecond delay of the tower top amplifier 104, the 180 nanosecond delay of the main coax cable 110, the 1.5 nanosecond delay of the cavity filter 108, the 6 nanosecond delay of the coax cable 112, the 2 nanosecond delay of the directional coupler 114, and the 3 nanosecond delay of the coax cable 116. By way of example only, if: the panel antenna 102 has a 0.5 nanosecond (ns) delay; the tower jumper 106 a 12 ns delay;

the tower top amplifier 104 a 2 ns delay; the main coax cable 10 a 180 ns delay; the cavity filter a 1.5 ns delay, the coax cable 1112 a 6 ns delay; the directional coupler 114 a 2 ns delay and the coax cable 116 a 3 ns delay, the delay of the receive link path 100 is 207 nanoseconds. Note, communication network base stations can include receive and/or transmit link paths, although only a receive link path is depicted in FIG. 1. Embodiments may be configured to determine delays of such link paths.

Figures 2, 3:
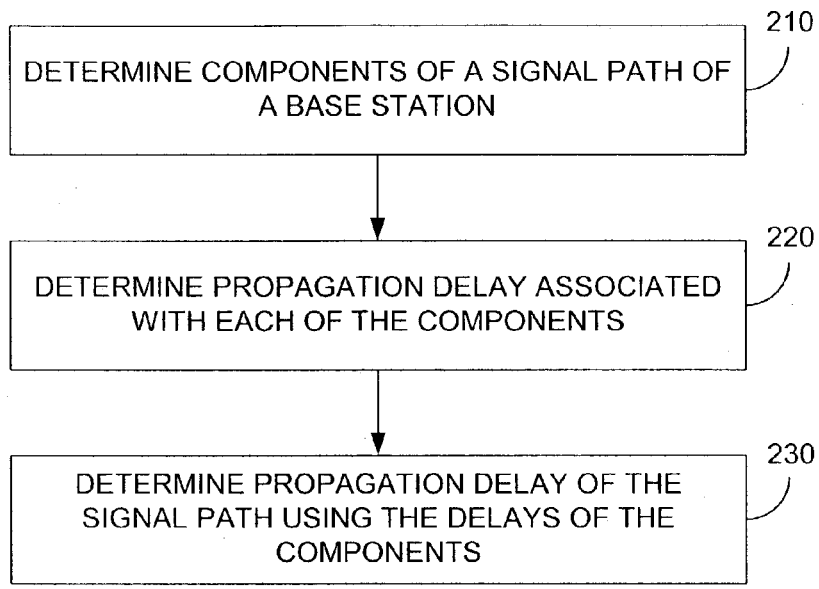
FIG. 2 is a flowchart depicting functionality of an embodiment of a delay offset link budget system.
FIG. 3 is a schematic diagram depicting an embodiment of a graphical user interface that can be provided by an embodiment of a delay offset link budget system.

An embodiment of a method that can be used for determining a delay of a communication network base station is depicted in the flowchart of FIG. 2. As shown in FIG. 2, the method may be construed as beginning at block 210, where components of a signal path of a base station are determined. With respect to FIG. 1, the components of the receive link path 100 are determined. In block 220, the propagation delay associated with each of the components is determined. Thereafter, such as depicted in block 230, the propagation delay of the signal path is determined using the delays of the respective components. For example, the delays can be added to determine the total delay of the signal path.

Some embodiments can provide a user with information corresponding to the delay of a signal path by use of a graphical user interface (GUI). FIG. 3 schematically depicts an embodiment of a GUI 300 that can be used to display such information to a user. In FIG. 3, various types of information are displayed. Specifically, a component list is displayed in column 310, notes are displayed in column 312, and corresponding delays for each component are depicted in column 314. Note, each of the components displayed in column 310 corresponds to the components of the receive link path 100 of FIG. 1.

Various techniques can be used for determining the information that is to appear in each field of a GUI, e.g., GUI 300. By way of example, the delay of a component can be provided by a manufacturer, can be determined by directly measuring the delay of the component, or can be estimated. In estimating the delay of a component, a component may be assumed to exhibit substantially the same delay as a like component about which a delay is known. Alternatively, if the delay of a propagation path that includes the component is known and only the delay attributable to that component is unknown, it can be assumed that any remaining delay is associated with the component of interest.

As will be described in detail, embodiments of Delay Offset Link Budget (DOLB) systems may be able to access and/or correlate information corresponding to the delays of components that are used in communication system base stations. Thus, the delays and/or corresponding delay offsets of such components can be determined.

DOLB systems can be implemented in software, firmware, hardware, or combinations thereof. When implemented in hardware, embodiments of a DOLB system can be implemented with any or a combination of various technologies. By way of example, the following technologies, which are each well known in the art, can be used: a discrete logic circuit(s) having logic gates for implementing logic functions upon data signals, an application specific integrated circuit(s) (ASIC) having appropriate combinational logic gates, a programmable gate array(s) (PGA), and a field programmable gate array(s) (FPGA).

Figure 4:
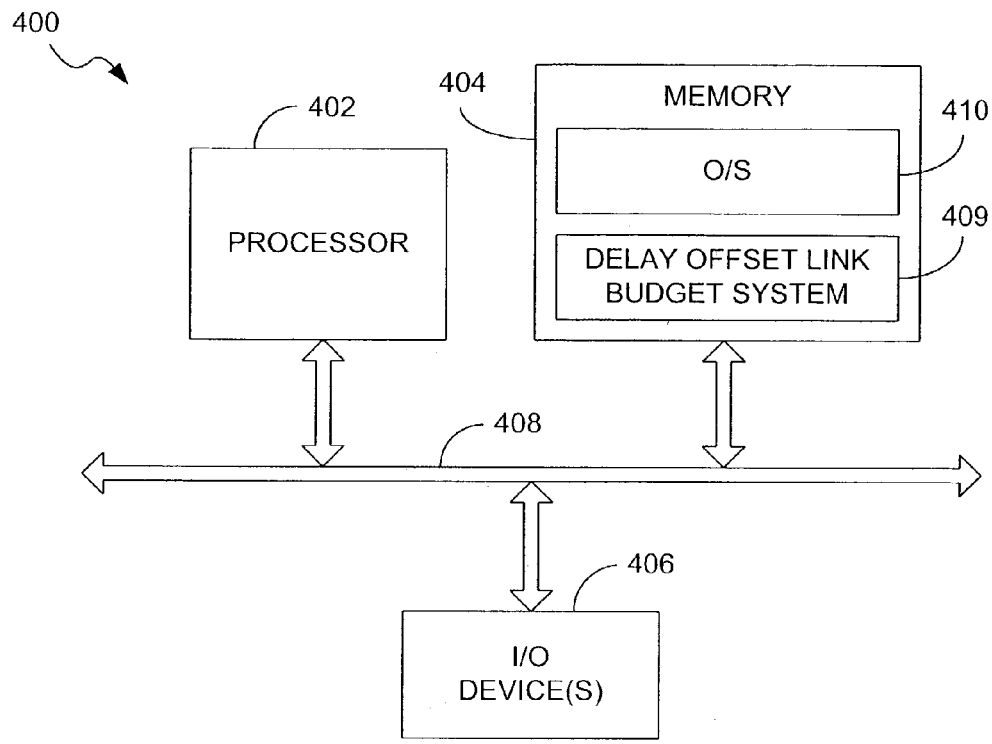
FIG. 4 is a schematic diagram depicting a computer or processor-based device that can be used to implement an embodiment of a delay offset link budget system.

When implemented in software, an embodiment of a DOLB system can be a program that is executable by a digital computer, an example of which is depicted schematically in FIG. 4. In FIG. 4, computer 400 includes a processor 402, memory 404, and one or more input and/or output (I/O) devices 406 (or peripherals) that are communicatively coupled via a local interface 408. Processor 402 can be a hardware device configured to execute software that can be stored in memory 404. Memory 404 can include any combination of volatile memory elements and/or nonvolatile memory elements. Moreover, memory 404 can incorporate electronic, magnetic, optical, and/or other types of storage media. Note that memory 404 can have a distributed architecture, where various components are situated remote from one another, but can be accessed by processor 402.

The software in memory 404 can include one or more separate programs, each of which comprises an ordered listing of executable instructions for implementing logical functions. The software in the memory 404 includes an embodiment of a DOLB system 409 and an operating system (O/S) 410. The O/S 410 controls the execution of other computer programs, such as DOLB system 409.

The I/O device(s) 406 can include input devices, such as a keypad, output devices, such as a speaker, and/or devices that are configured to communicate both inputs and outputs, such as a communication interface and/or touchscreen.

When DOLB system 409 is implemented in software, it should be noted that the DOLB system 409 can be stored on any computer-readable medium for use by or in connection with a computer-related system or method. In the context of this document, a computer-readable medium is an electronic, magnetic, optical, or other physical device or means that can contain or store a computer program for use by or in connection with a computer-related system or method. DOLB system 409 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As used herein, a "computer-readable medium" can be any means that can store, communicate, propagate or transport a program for use by or in connection with an instruction execution system, apparatus, or device. Thus, a computer readable medium can be, for example but not limited to, an electronic, magnetic, optical, electromagnetic, infrared, or semiconductor system, apparatus, device, or propagation medium. More specific examples (a nonexhaustive list) of a computer-readable medium include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program could be electronically captured, via optical scanning of the paper or other medium, then compiled, interpreted or otherwise processed in a suitable manner, if necessary, and then stored in a computer memory.

Reference will now be made to the flowchart of FIG. 5, which depicts the functionality of an embodiment of DOLB system 409. In this regard, each block of the flowchart represents a module segment or portion of code that comprises one or more executable instructions for implementing the specified logical function(s). It should also be noted that in some alternative implementations the functions noted in various blocks of FIG. 5, or any other of the accompanying flowcharts, may occur out of the order in which they are depicted. For example, two blocks shown in succession in FIG. 5 may, in fact, be executed substantially concurrently. In other embodiments, the blocks may sometimes be executed in the reverse order depending upon the functionality involved.

Figure 5:
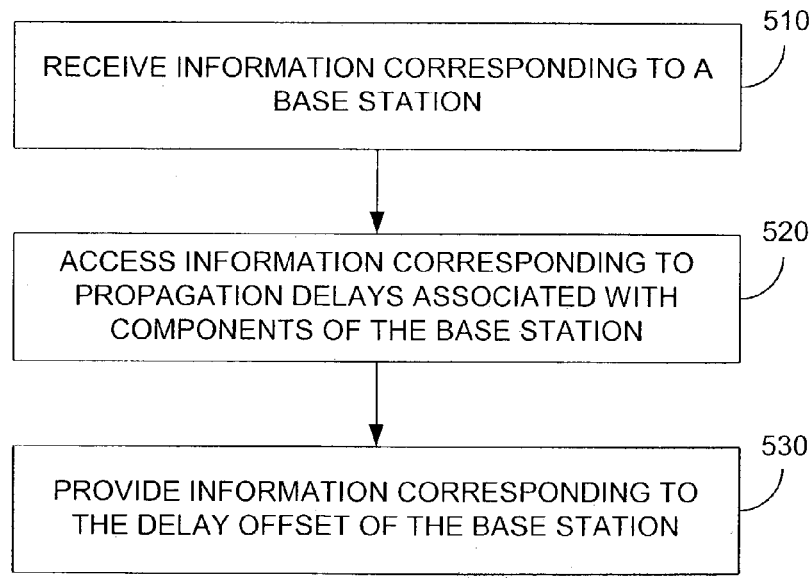
FIG. 5 is a flowchart depicting functionality of an embodiment of a delay offset link budget system.

As shown in FIG. 5, the functionality (or method) of the embodiment of the DOLB system 409 of FIG. 4 maybe construed as beginning at block 510, where information corresponding to a base station is received. In block 520, information corresponding to the propagation delays associated with components of the base station is accessed. In block 530, information corresponding to the delay offset of the base station is provided. Typically, this is accomplished by using the information corresponding to the propagation delays of the components to determine the delay offset.

Figure 6:
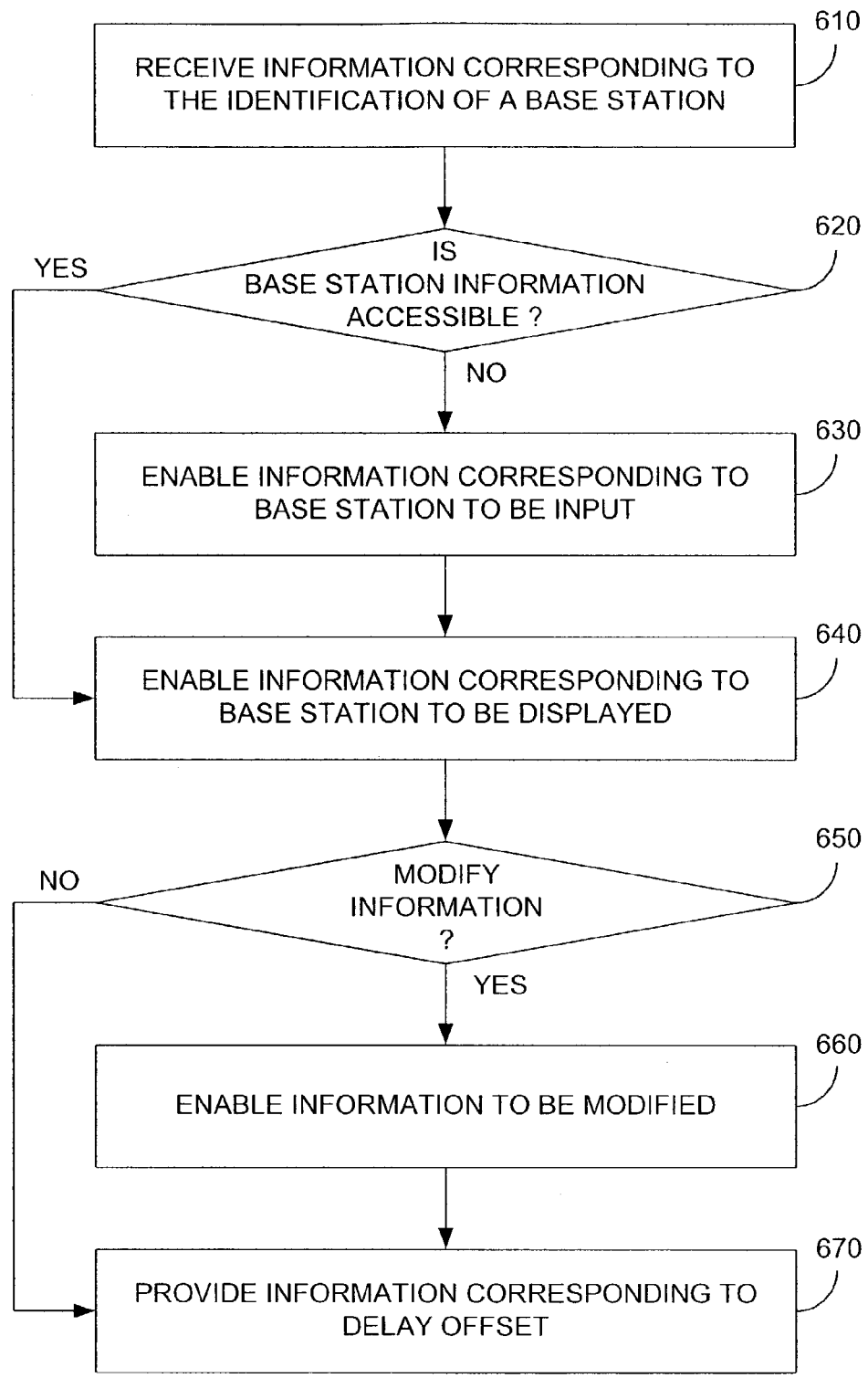
FIG. 6 is a flowchart depicting functionality of another embodiment of a delay offset link budget system.

Functionality of another embodiment of a DOLB system is depicted in the flowchart of FIG. 6. As shown in FIG. 6, the functionality (or method) may be construed as beginning at block 610, where information corresponding to the identification of a base station is received. In block 620, a determination is made as to whether information corresponding to the identified base station is accessible. If the information is not accessible, information corresponding to the identified base station is enabled to be input. In particular, the information to be input my include one or more of a base station 10, a component of a link path of the base station, and a propagation characteristic of a component, e.g., the delay of a component. In block 640, information corresponding to the identified base station is enabled to be displayed to the user. Note, the process also proceeds to block 640 if it were determined in block 620 that information corresponding to the identified base station was accessible. In such an instance, the information could be accessed and then displayed to the user.

Proceeding to block 650, a determination is made as to whether information corresponding to the identified base station is to be modified. If it is determined that the information is to be modified, the process proceeds to block 660 where the information is enabled to be modified. By way of example, in some embodiments, a user may be enabled to actuate a field of a graphical user interface and input information corresponding to the actuated field. In block 670, information corresponding to a delay offset of the identified base station is provided. For instance, the delay of one or more link paths of the base station can be displayed to the user. Note, the process may also proceed to block 670 if it were determined in block 650 that information was not to be modified.

FIG. 7 is a schematic diagram depicting another embodiment of a graphical user interface, i.e., GUI 700, that can be used for determining information corresponding to delay offsets of communication network base stations. As shown in FIG. 7, GUI 700 includes a base station identification field 702, within which identification information associated with a base station of interest is displayed. Information associated with the identified base station is depicted among columns 704, 706 and 708. Specifically, components associated with one or more link paths of the base station are depicted in the components column 704; notes, such as type, length and/or delays associated with the components, are depicted in note column 706; and the delays, e.g., known and/or predicted delays, are depicted in the delay column 708.

When information is provided to a particular field, information can be provided for display in one or more associated fields. By way of example, when "XXX-00" is provided to field 710, such as by manual entry of a user, a known delay for that type of antenna can be provided in field 712.

Note that GUI 700 is displaying components of a base station that correspond to the components displayed in GUI 300 of FIG. 3. However, the information corresponding to the directional coupler depicted in fields 720, 722 and 724 is different than that depicted in FIG. 3. Specifically, it has been determined that the directional coupler exhibits a delay of 1.5 nanoseconds, compared to the 2.0 nanosecond delay of FIG. 3. This modified information could be provided to the DOLB system by actuating field 724 and entering the modified delay of 1.5 nanoseconds. As shown, providing modified information directly affects the total delay, which is displayed in field 730.

Clearly, information corresponding to components can be stored in various manners. By way of example, in some embodiments, the information can be stored locally. In other embodiments, information can be stored remotely, such as by a remote database that can be accessed via a communication network, e.g., the Internet. An example of an embodiment that stores information locally and/or remotely is depicted in FIG. 8.

In FIG. 8 system 800 includes a mobile measuring system 810. Mobile measuring system 810 includes equipment 812 that is capable of measuring a delay of a base station, an embodiment of a DOLB system 814 and information 816 corresponding to base station components.

In particular, information 816 can include information corresponding to one or more components that may be included in a link path of a base station, such as base station 818 and 820. Information corresponding to such components also can be stored at a location remote from the mobile measuring system 810. Information 822 depicts such remote information.

Information 822 can be accessed by mobile measuring system 810 via communication network 824. Communication network 824 may be any type of communication network employing any network topology, transmission medium, or network protocol. For example, such a network may be any public or private packet-switched or other data network, including the Internet, circuit-switched networks, such as the public switched telephone network (PSTN), wireless network, or any other desired communications infrastructure and/or combination of infrastructures.

Although various types of measuring equipment can be used in a mobile measuring system, one preferred embodiment includes a receiving antenna for monitoring a signal transmitted from a base station, a GPS antenna for receiving information from GPS satellites, and a time offset measuring system, such as an E6459A Enhanced Timing Offset Measurement System, manufactured by Agilent Technologies. The measuring equipment is used to monitor the signals from several GPS satellites and derives an accurate even-second clock from the signals. The measuring equipment then identifies the start of a PN sequence in a base station BTS waveform and compares it with the rising edge of the even-second clock. This enables a timing correction factor or delay offset to be determined. Additional information on base station testing is provided in the Agilent Technologies' E6459A Enhanced Time Offset Measurement System User's Guide, which is incorporated by reference herein.

Once the information corresponding to the delay of a base station is determined. The information obtained by the measuring equipment can be compared to a predicted delay provided by a DOLB system. Thus, the accuracy of predicted delays provided by a DOLB system can be determined. The information also can be used to provide a predicted delay for one or more other base stations that are similarly configured. For example, if base station 820 includes components identical to those used in the signal path of base station 818, the delay determined by the mobile measuring system with respect to base station 818 can be used for base station 820 as well.

It should be emphasized that many variations and modifications may be made to the above-described embodiments. All such modifications and variations are intended to be included herein within the scope of this disclosure and protected by the following claims.

The invention claimed is:

1. A method for determining a delay offset of a communication system comprising:
   determining components of a propagation path of a base station of a communication network;
   determining a propagation delay associated with each of the components; and
   determining a delay of the propagation path using the delays of the components.

2. The method of claim 1, wherein determining the delay of each of the components comprises:
   providing a database including information corresponding to base station components and associated propagation delays; and
   accessing the database to determine a delay associated with at least one of the components of the base station.

3. The method of claim 2, wherein determining the delay of each of the components comprises:
   measuring the delay of at least one of the components of the base station.

4. The method of claim 1, further comprising:
   verifying the delay of the propagation path by measuring the delay of the propagation path.

5. The method of claim 4, further comprising:
   identifying multiple base stations containing corresponding components; and
   using a determined delay of one of the base stations as a predicted delay of at least one of the other base stations identified.

6. A system for determining information corresponding to a delay offset of a communication system comprising:
   a delay offset link budget system operative to determine components of a propagation path of a base station of a communication network, to determine a propagation delay associated with each of the components, and to determine information corresponding to the delay of the propagation path using the delays of the components.

7. The system of claim 6, further comprising:
   a database including information corresponding to base station components and associated propagation delays; and
   wherein said delay offset link budget system is operative to access the database to determine a delay offset of at least one of the components.

8. The system of claim 7, wherein the delay offset link budget system includes a memory; and
   wherein the database is stored in the memory of the delay offset link budget system.

9. The system of claim 7, wherein the database is located remotely from the delay offset link budget system; and
   wherein the delay offset link budget system is operative to communicate with a communication network for accessing the database.

10. The system of claim 6, further comprising:
    measuring equipment operative to measure a propagation delay of a signal transmitted from a base station of a communication system.

11. The system of claim 10, wherein the measuring equipment comprises a Global Positioning System receiver.

12. The system of claim 11, wherein the measuring equipment further comprises a laser range-finder.

13. The system of claim 6, further comprising:
    means for measuring a propagation delay of a signal transmitted from a base station of a communication system.

14. The system of claim 6, wherein the delay offset link budget system is operative to provide a graphical user interface, the graphical user interface being operative to display information corresponding to components of the propagation path of the base station to a user.

15. The system of claim 14, wherein the graphical user interface is operative to enable a user to actuate a field of the graphical user interface and to modify information associated with the field.

16. A computer-readable medium having a computer program for determining a delay offset of a communication system, said computer program comprising:
    logic configured to determine components of a propagation path of a base station of a communication network;
    logic configured to determine a propagation delay associated with each of the components; and
    logic configured to determine a delay of the propagation path using the delays of the components.

17. The computer-readable medium of claim 16, wherein the logic configured to determine the delay of each of the components comprises:
    logic configured to access a database, the database including information corresponding to base station components and associated propagation delays.

18. The computer-readable medium of claim 17, wherein the logic configured to determine the delay of each of the components comprises:
    logic configured to measure the delay of at least one of the components of the base station.

19. The computer-readable medium of claim 17, further comprising:
    logic configured to verify the delay of the propagation path by measuring the delay of the propagation path of the base station.

20. The computer-readable medium of claim 17, further comprising:
    logic configured to identify multiple base stations containing corresponding components; and
    logic configured to use a determined delay of one of the base stations as a predicted delay of at least one of the other base stations identified.

* * * * *